United States Patent
Matsuya et al.

(10) Patent No.: US 9,491,379 B2
(45) Date of Patent: Nov. 8, 2016

(54) SOLID-STATE IMAGE PICKUP DEVICE WHICH INCREASES VIDEO READING SPEED AND REDUCES DISTORTION

(71) Applicant: PANASONIC INTELLECTUAL PROPERTY MANAGEMENT CO., LTD., Osaka (JP)

(72) Inventors: Hideo Matsuya, Osaka (JP); Ryohei Miyagawa, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/745,270

(22) Filed: Jun. 19, 2015

(65) Prior Publication Data

US 2015/0288895 A1    Oct. 8, 2015

Related U.S. Application Data

(63) Continuation of application No. PCT/JP2013/006716, filed on Nov. 15, 2013.

(30) Foreign Application Priority Data

Dec. 25, 2012    (JP) .................................. 2012-281210

(51) Int. Cl.
*H04N 5/335*    (2011.01)
*H04N 5/341*    (2011.01)
(Continued)

(52) U.S. Cl.
CPC ............ *H04N 5/341* (2013.01); *H04N 5/2258* (2013.01); *H04N 5/374* (2013.01); *H04N 5/378* (2013.01)

(58) Field of Classification Search
CPC ..... H04N 5/2258; H04N 5/378; H04N 5/374
USPC ............................................................ 348/308
See application file for complete search history.

(56) References Cited

U.S. PATENT DOCUMENTS 6,466,265 B1 * 10/2002 Lee .................... H04N 3/1512
                                                            348/308
8,462,260 B2    6/2013 Amano
(Continued)

FOREIGN PATENT DOCUMENTS

JP     05-022667 A    1/1993
JP     2006-270292 A    10/2006
(Continued)

OTHER PUBLICATIONS

International Search Report issued in corresponding International Patent Application No. PCT/JP2013/006716, mailed on Jan. 7, 2014; 2 pages with English translation.

*Primary Examiner* — Usman Khan
(74) *Attorney, Agent, or Firm* — McDermott Will & Emery LLP

(57) ABSTRACT

A solid-state image pickup device includes: a first pixel array which generates first pixel data; a second pixel array which generates second pixel data; a vertical scanning unit which drives the rows of the first pixel array and the rows of the second pixel array independently; and a signal processing circuit which outputs, as a single image signal, a pair of (i) the plurality of second pixel signals generated in the second pixel array in a first frame and (ii) the plurality of first pixel signals generated in the first pixel array in a second frame immediately after the first frame.

8 Claims, 8 Drawing Sheets

(51) Int. Cl.
   *H04N 5/374* (2011.01)
   *H04N 5/225* (2006.01)
   *H04N 5/378* (2011.01)

(56) References Cited

U.S. PATENT DOCUMENTS

| | | | |
|---|---|---|---|
| 2003/0025820 A1* | 2/2003 | Miyahara | H04N 3/1575 348/323 |
| 2004/0012684 A1* | 1/2004 | Tinnerino | H04N 3/1593 348/208.1 |
| 2006/0055793 A1* | 3/2006 | Adler | A61B 1/045 348/211.99 |
| 2006/0170799 A1* | 8/2006 | Meisenzahl | H04N 3/1575 348/294 |
| 2010/0149391 A1* | 6/2010 | Kameshima | H04N 5/32 348/300 |
| 2010/0327176 A1* | 12/2010 | Takenaka | H04N 5/335 250/394 |
| 2011/0019071 A1 | 1/2011 | Amano | |
| 2011/0095169 A1* | 4/2011 | Takenaka | H04N 5/3658 250/208.1 |
| 2013/0033632 A1* | 2/2013 | Kishi | H01L 27/14634 348/308 |

FOREIGN PATENT DOCUMENTS

JP  2010-213220 A  9/2010
JP  2011-029836 A  2/2011

\* cited by examiner

SOLID-STATE IMAGE PICKUP DEVICE WHICH INCREASES VIDEO READING SPEED AND REDUCES DISTORTION

CROSS REFERENCE TO RELATED APPLICATIONS

This is a continuation application of PCT International Application No. PCT/JP2013/006716 filed on Nov. 15, 2013, designating the United States of America, which is based on and claims priority of Japanese Patent Application No. 2012-281210 filed on Dec. 25, 2012. The entire disclosures of the above-identified applications, including the specifications, drawings and claims are incorporated herein by reference in their entirety.

FIELD

The present disclosure is applicable to a solid-state image pickup device.

BACKGROUND

With regard to solid-state image pickup devices, there are demands for increase in the number of pixels for providing high-resolution images and acceleration of output for providing smooth video.

FIG. 11 is a diagram illustrating a CCD solid-state image pickup device disclosed in Patent Literature 1. In this solid-state image pickup device, a light receiving surface of an imaging area 2 is divided into four segments. Each of the segments I to IV is provided with vertical transfer CCDs 3UL, 3UR, 3DL, and 3DR and horizontal transfer CCDs 5LU, 5RU, 5LD, and 5RD, all of which are independent from each other. A signal charge generated in each of the segments I to IV is transferred in an upper or lower direction by a corresponding one of the vertical transfer CCDs 3UL, 3UR, 3DL, and 3DR, and is then transferred in a right or left direction by a corresponding one of the horizontal transfer CCDs 5LU, 5RU, 5LD, and 5RD. The signal processing systems (9 to 12) output signals while adjusting a derived temporal relationship between signals to be output from the four systems. In other words, Patent Literature 1 discloses a method for dividing a pixel area at least horizontally or vertically for accelerating operations and providing a mechanism for reading each of the segments.

CITATION LIST

Patent Literature

[PTL 1]
Japanese Unexamined Patent Application Publication No. 5-22667

SUMMARY

Technical Problem

Here, a CMOS solid-state image pickup device (a CMOS image sensor) needs to perform scanning on a per row basis in order to extract image data of a plurality of pixels arranged in a matrix, unlike a CCD solid-state image pickup device. Furthermore, when a solid-state image pickup device uses exposure based only on time in which charge is accumulated (hereinafter referred to as charge accumulation time), that is, uses a rolling shutter without having any mechanical shutter, exposure timings in imaging vary for each line, and pixel data is read in time series. In this way, charge accumulation time is shifted by time required for scanning on a per scanning line basis. As a result, when a subject moves or an image pickup device moves horizontally, in general, image distortion what is called a focal plane phenomenon occurs.

Here, a consideration is given of a case where an imaging area is vertically divided into two segments to accelerate operations as in the technique disclosed in Patent Literature 1 in a CMOS solid-state image pickup device, and signals are read out from the two segments simultaneously. When a subject moves or the image pickup device moves in the case where the scanning directions of vertically adjacent imaging areas are the same, the subject represented in a center part of a picture may look partly cut due to shutter time differences. When scanning is performed from the center part to a periphery or from a periphery to the center part in both of the vertically adjacent imaging areas, the difference in image obtainment time at the center part can be reduced, which eliminates the possibility that the subject looks partly cut. However, in this case, a subject distortion direction from the center part to the periphery is opposite, and the subject looks folded in the center part in a resulting unnatural image.

In view of this, the present disclosure provides a solid-state image pickup device capable of increasing video reading speed and reducing subject distortion that occurs in the center part of a picture.

Solution to Problem

A solid-state image pickup device according to an aspect of the present disclosure includes: a first pixel array in which a plurality of first pixels are arranged two-dimensionally, the plurality of first pixels generating a plurality of first pixel signals by photo-electrically converting received light; a second pixel array that is arranged vertically adjacent to the first pixel array and in which a plurality of second pixels are arranged two-dimensionally, the plurality of second pixels generating a plurality of second pixel signals by photo-electrically converting received light; a plurality of first vertical signal lines each of which is provided for a corresponding one of columns of the first pixel array and receives a corresponding one of first pixel signals generated by first pixels arranged in the corresponding one of the columns, the first pixels being included in the plurality of first pixels; a plurality of second vertical signal lines each of which is provided for a corresponding one of columns of the second pixel array and receives a corresponding one of second pixel signals generated by second pixels arranged in the corresponding one of the columns, the second pixels being included in the plurality of second pixels, the plurality of second vertical signal lines being independent from the plurality of first vertical signal lines; a vertical scanning unit configured to drive rows of the first pixel array and rows of the second pixel array independently; and a signal processing circuit which outputs, as a single image signal, a pair of (i) the plurality of second pixel signals generated in the second pixel array in a first frame and (ii) the plurality of first pixel signals generated in the first pixel array in a second frame immediately after the first frame.

With this configuration, the solid-state image pickup device is capable of reading the pixel signals independently from the two pixel arrays, and is thus capable of achieving an increased image reading speed. The solid-state image pickup device further outputs, as the one image signal, the second pixel signals in the first frame and the first pixel signals in the second frame. In this way, the solid-state image pickup device is capable of reducing the possibility that the image of the subject looks cut at the center part. In this way, the solid-state image pickup device is capable of increasing image reading speed and reducing subject distortion that occurs in the center part of the picture.

For example, the vertical scanning unit may be configured to scan the rows of the first pixel array and the rows of the second pixel array in a same direction.

For example, the vertical scanning unit may be configured to scan the rows of the first pixel array from a boundary between the first pixel array and the second pixel array, and scan the rows of the second pixel array to the boundary.

For example, the signal processing circuit may include: a first memory which outputs the plurality of second pixel signals after storage for a one-frame period; and a second memory which stores, as the single image signal, the plurality of second pixel signals output from the first memory and the plurality of first pixel signals.

For example, the first memory may be a first-in first-out (FIFO) memory having a memory capacity larger than an amount corresponding to the plurality of second pixel signals corresponding to one frame.

For example, the signal processing circuit may further include a selector which (i) selects either the plurality of second pixel signals to be output from the first memory or the plurality of second pixel signals before being stored in the first memory, and (ii) outputs, to the second memory, the plurality of second pixel signals selected, and the second memory may store, as the single image signal, the plurality of second pixel signals output from the selector and the plurality of first pixel signals.

With this configuration, for example, the solid-state image pickup device outputs, as the one image signal, the second pixel signals of the first frame and the first image signals of the second frame in video capturing requiring a high reading speed, while outputting, as the one image signal, the first image signals and the second image signals of the same frame in still image capturing.

For example, the signal processing circuit may further include a clock stopping unit configured to stop supply of a clock signal to the first memory when the selector selects the plurality of second pixel signals before being stored in the first memory.

With this configuration, the solid-state imaging device is capable of reducing power consumption in the still image capturing.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects

The present disclosure provides a solid-state image pickup device capable of increasing video reading speed and reducing subject distortion that occurs in the center part of a picture.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DESCRIPTION OF EMBODIMENT

Hereinafter, an embodiment is described in detail with reference to the attached drawings.

The exemplary embodiment described below represents general or specific examples. The numerical values, shapes, materials, constituent elements, the arrangement and connection of the constituent elements, steps, the processing order of the steps etc. described in the following exemplary embodiment are mere examples, and therefore do not limit the scope of the present disclosure. Therefore, among the constituent elements in the following exemplary embodiment, constituent elements not recited in the independent claim are described as arbitrary constituent elements.

First, a configuration of a unit pixel (unit cell) for use in a solid-state image pickup device according to this embodiment is described.

Figure 1:
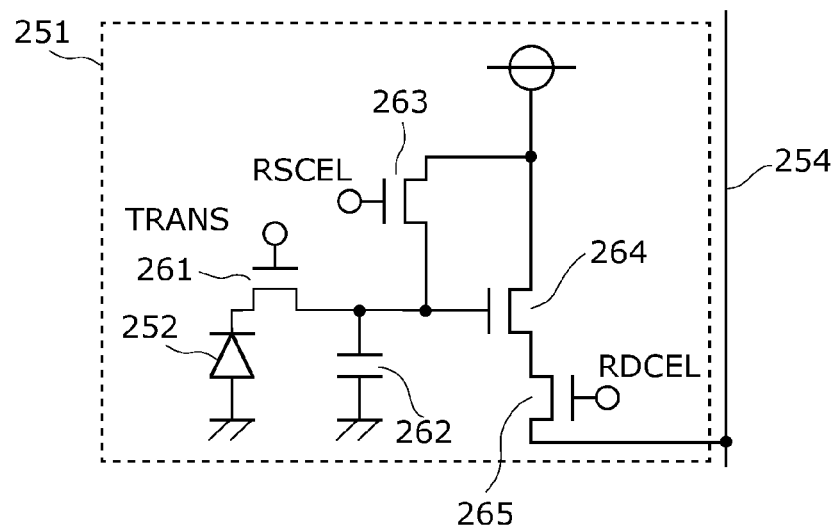
FIG. 1 is a diagram illustrating an example of a pixel according to an embodiment.

FIG. 1 is a circuit diagram illustrating a configuration of a pixel 251 included in the solid-state image pickup device according to this embodiment.

The pixel 251 illustrated in FIG. 1 outputs a reset voltage obtained by amplifying a voltage at the time of initialization and a read voltage obtained by amplifying a voltage at the time of reading to a vertical signal line 254. The pixel 251 includes a photo-electric conversion element 252 (photodiode), a capacitor 262 (floating diffusion), a reset transistor 263, an amplifier transistor 264, and a selector transistor 265.

The photo-electric conversion element 252 generates charge by photo-electrically converting incident light. The capacitor 262 accumulates charge generated by the photo-electric conversion element 252, and outputs the accumulated charge as a voltage signal.

The reset transistor 263 resets a voltage of the capacitor 262 to an initial voltage (here, a VDD). The transfer transistor 261 supplies charge generated by the photo-electric conversion element 252 to the capacitor 262. The amplifier transistor 264 outputs a voltage according to a voltage value of the capacitor 262. The selector transistor 265 connects an output terminal of the amplifier transistor 264 to the vertical signal line 254.

Figure 2:
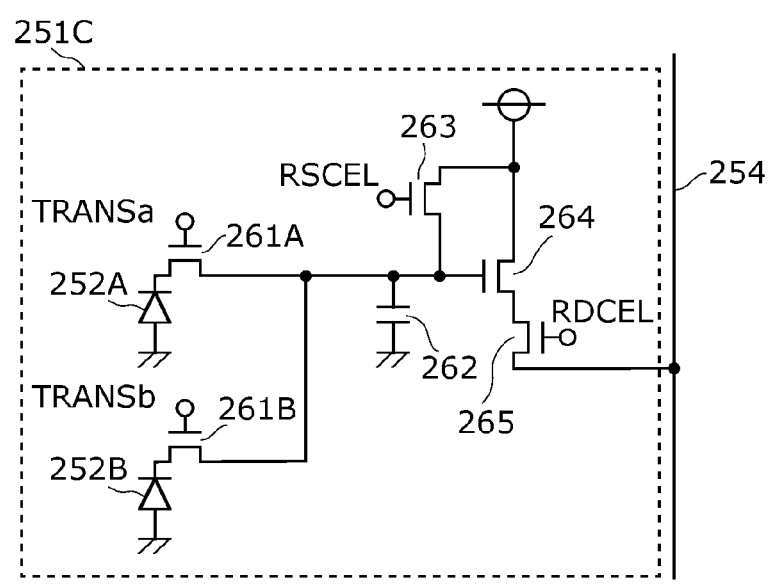
FIG. 2 is a diagram illustrating an example of a pixel according to the embodiment.

The solid-state image pickup device according to the embodiment may use a pixel 251C illustrated in FIG. 2.

The pixel 251C illustrated in FIG. 2 is what is called a multi-pixel one-cell configuration in which two pixels adjacent in a row direction are included in a single basic unit cell. The pixel 251C includes two photo-electric conversion elements 252A and 252B, two transfer transistors 261A and 261B, a capacitor 262, a reset transistor 263, an amplifier transistor 264, and a selector transistor 265.

The transfer transistor 261A supplies charge generated by the photo-electric conversion element 252A to the capacitor 262. The transfer transistor 261B supplies charge generated by the photo-electric conversion element 252B to the capacitor 262. The other configuration is the same as in FIG. 1.

Figure 3:
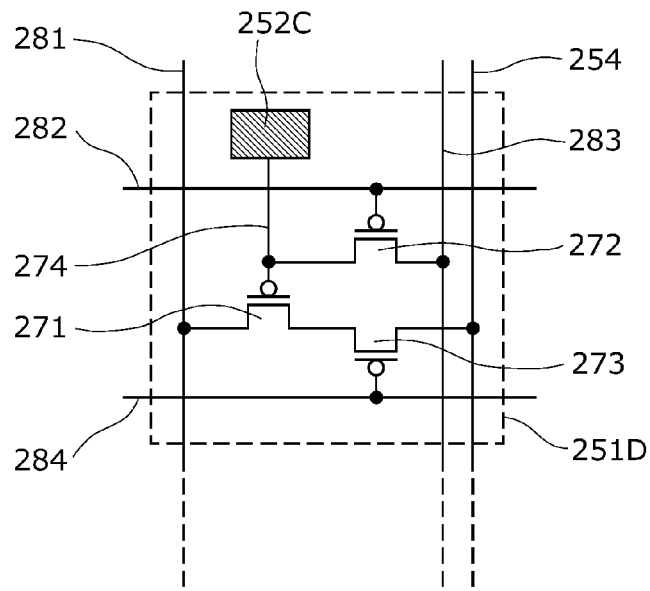
FIG. 3 is a diagram illustrating an example of a pixel according to the embodiment.

Furthermore, the solid-state image pickup device according to the embodiment may use a pixel 251D illustrated in FIG. 3. The pixel 251D illustrated in FIG. 3 includes a photo-electric conversion film as a photo-electric conversion element. The pixel 251D includes an amplifier transistor 271, a reset transistor 272, a selector transistor 273 (address transistor), a photo-electric conversion element 252C (photoelectric conversion film), and lines for connecting these elements.

The amplifier transistor 271 has a source connected to a power line 281 running in a vertical direction. The reset transistor 272 has a gate connected to a reset signal line 282 running in a horizontal direction, and has a source connected to a reset voltage line 283 running in the vertical direction. The selector transistor 273 has a gate connected to an address signal 284 running in the horizontal direction, and has a drain connected to the vertical signal line 254 running in a vertical direction.

Figure 4:
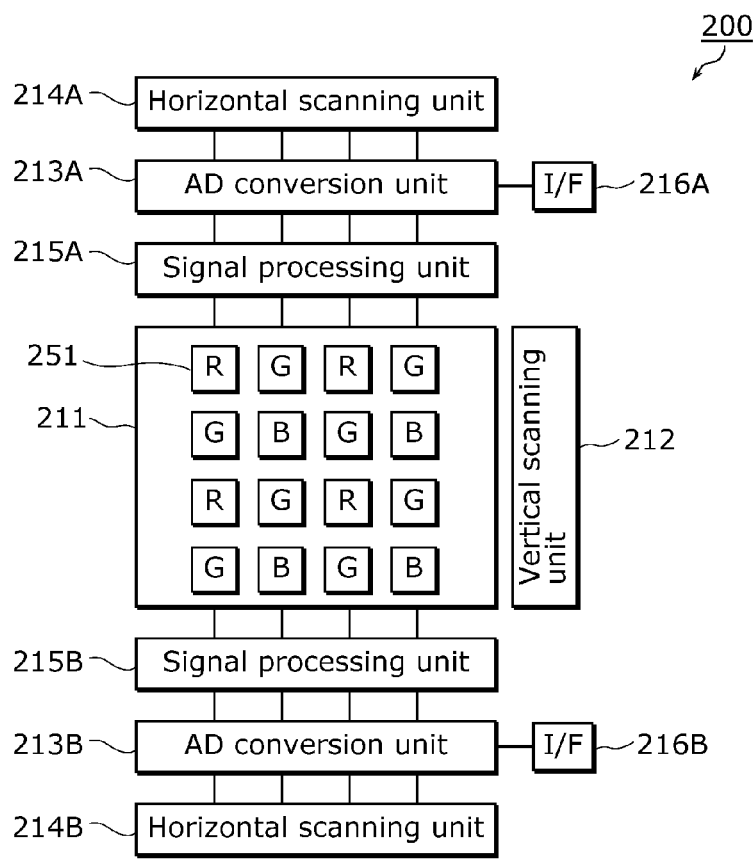
FIG. 4 is a block diagram illustrating an example of an imaging element according to the embodiment.

An imaging element 200 included in a solid-state image pickup device according to this embodiment is schematically described next. FIG. 4 is a block diagram illustrating the whole configuration of the imaging element 200 according to the embodiment of the present disclosure.

The imaging element 200 includes: a pixel array 211; a vertical scanning unit 212 (row selector encoder); two signal processing units 215A and 215B; two AD conversion units 213A and 213B (analog-digital conversion units); two horizontal scanning units 214A and 214B (column selector encoder); and two digital output units 216A and 216B (I/F).

The pixel array 211 is an imaging area in which a plurality of pixels 251 for photo-electric conversion are arranged two dimensionally. A 16-pixel array in which 4×4 pixels are arranged two dimensionally is shown here as an example, but the total number of pixels arranged actually is approximately several millions.

The vertical scanning unit 212 outputs a control signal to three control lines RDCEL, RSCEL, and TRANS provided for each horizontal row of the pixel array 211. In this way, the vertical scanning unit 212 performs, on a per row basis, a reset (initialization) operation, a read operation, and a line (row) selection operation, on each of the plurality of pixels 251 included in the pixel array 211.

The signal processing units 215A and 215B each include a plurality of row signal processing circuits each having the same configuration. The row signal processing units are provided respectively for the columns. The signal processing units 215A and 215B process output signals from the pixel array 211 on a per row basis, and store the result of the processes.

The AD conversion units 213A and 213B each include a plurality of column AD conversion circuits provided respectively for the columns. The AD conversion units 213A and 213B perform digital conversion on output signals that are output on a per row basis from the signal processing units 215A and 215B, and store the result of the conversion.

The horizontal scanning units 214A and 214B sequentially select the column AD conversion circuits included in the AD conversion units 213A and 213B, and sequentially output the digital signals stored in the plurality of column AD conversion circuits.

The digital output units 216A and 216B receive digital signals that are output from the AD conversion units 213A and 213B, convert the digital signals as required for output to outside, and output the converted digital signals.

In this way, sets of one of the signal processing units, one of the AD conversion units, one of the horizontal scanning units, and one of the digital output units are arranged respectively above and below the pixel array 211. Each of the signals detected in the pixel array 211 is directed to a corresponding one of the upper circuit and the lower circuit which are vertically adjacent to each other in the pixel array 211, and then output from the directed circuits to outside. In this way, the signals are output through the two systems, which accelerates signal reading.

Figure 5:
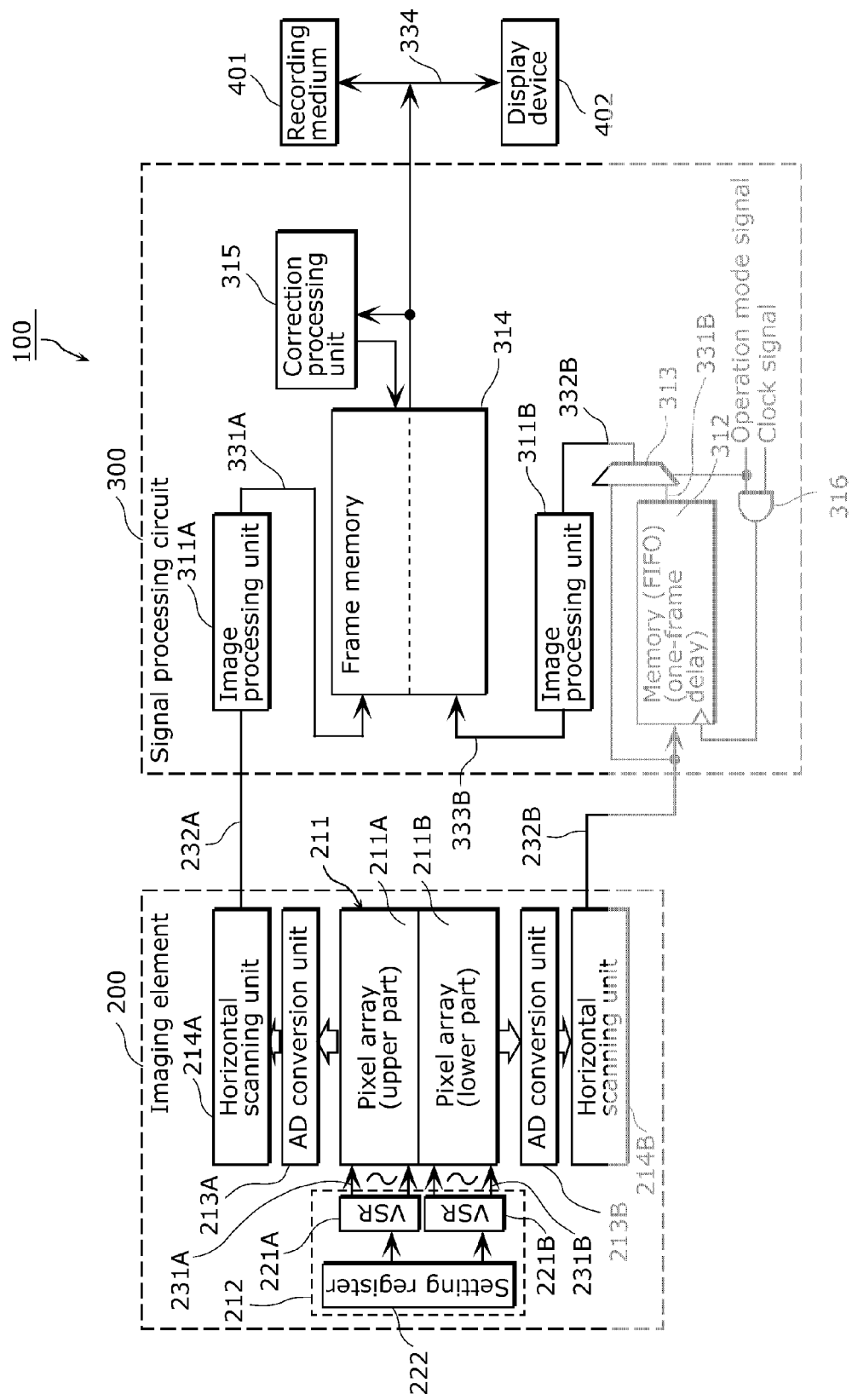
FIG. 5 is a block diagram of a solid-state image pickup device according to the embodiment.

Next, a description is given of a configuration of a solid-state image pickup device 100 according to this embodiment. FIG. 5 is a block diagram of the configuration of the solid-state image pickup device 100 according to the embodiment. The solid-state image pickup device 100 is used, for example, for image pickup devices (such as cameras and camera modules).

The solid-state image pickup device 100 illustrated in FIG. 5 includes an imaging element 200 and a signal processing circuit 300. The imaging element 200 and the signal processing circuit 300 may be implemented as individual semiconductor integrated circuits (LSIs), or may be implemented as single semiconductor integrated circuits. Some of the processing units included in the signal processing circuits 300 and the imaging element 200 may be implemented as a single semiconductor integrated circuit.

The imaging element 200 is a CMOS image sensor that converts incident light into pixel data 232A and 232B that are electric signals. This imaging element 200 includes a pixel array 211, a vertical scanning unit 212, AD conversion units 213A and 213B, and horizontal scanning units 214A and 214B.

The pixel array 211 is a two-dimensional imaging area including a plurality of photo-conversion elements (light receiving units or photodiodes). The pixel array 211 includes a pixel array 211A (first pixel array) arranged at the upper part of the pixel array 211 (the upper side of the pixel array 211 in a plan view) and a pixel array 211B (second pixel array) arranged at the lower part of the pixel array 211 (the lower side of the pixel array 211 in a plan view).

Figure 6:
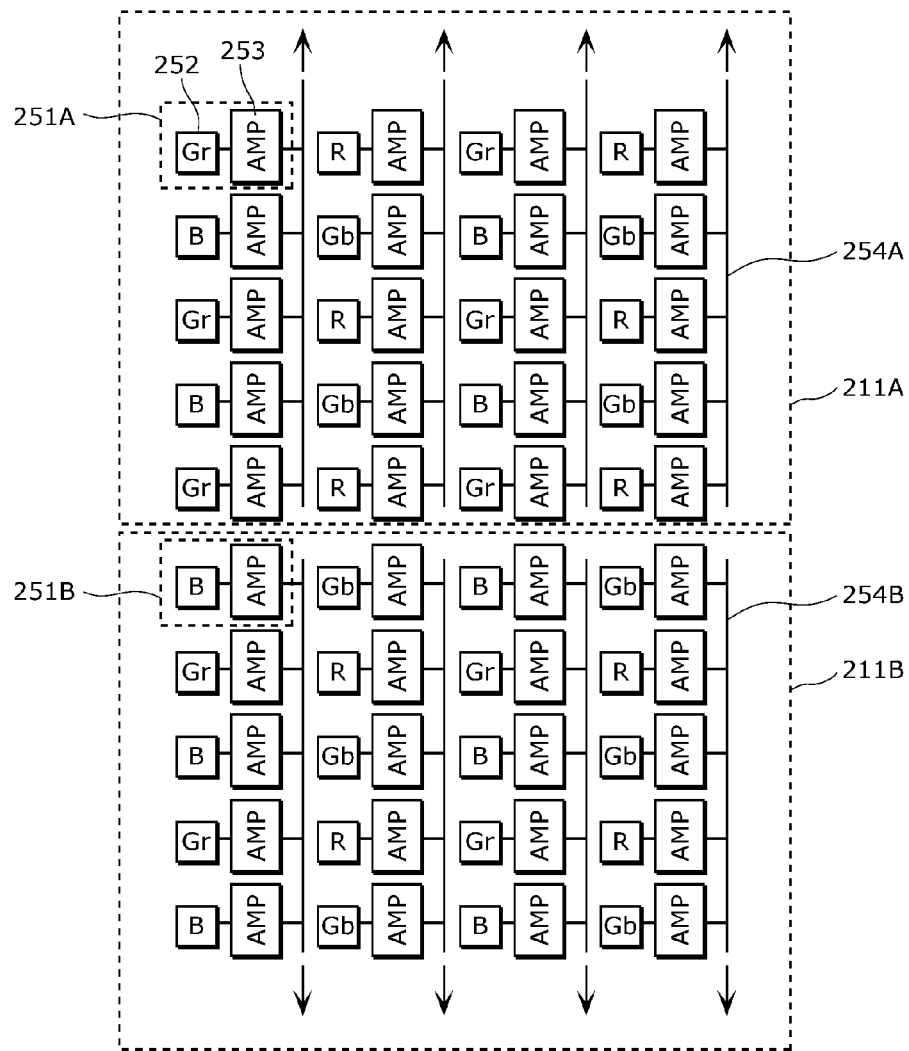
FIG. 6 is a diagram illustrating a pixel array according to the embodiment.

FIG. 6 is an enlarged view of part of the pixel array 211. As illustrated in FIG. 6, the pixel array 211A includes a plurality of pixels 251A and a plurality of vertical signal lines 254A.

The plurality of pixels 251A are arranged in a matrix on the pixel array 211A. In FIG. 6, pixels R, G, and B are arrayed in an array called a Bayer array. Each pixel 251A includes a photo-electric conversion element 252 and a pixel circuit 253 (AMP). For example, each of the pixels 251A and 251B is a pixel 251 illustrated in FIG. 1. In other words, the pixel circuit 253 includes a transfer transistor 261, a capacitor 262, a reset transistor 263, an amplifier transistor 264, and a selector transistor 265 illustrated in FIG. 1. It is to be noted that a pixel 251A or a pixel 251B may be configured as illustrated in FIG. 2 or FIG. 3.

The vertical signal line 254A (first vertical signal line) is provided for each of columns of the pixel array 211A. First pixel signals generated by the respective pixels 251A arranged in the corresponding column are output.

Likewise, the pixel array 211B includes a plurality of pixels 251B and a plurality of vertical signals 254B. For example, the number of pixels 251B and the number of vertical signal lines 254B are the same as the number of pixels 251A and the number of vertical signal lines 254A. In other words, the pixel array 211A and the pixel array 211B are equal-sized segments arranged vertically in the pixel array 211.

The plurality of pixels 251B are arranged in a matrix on the pixel array 211B. Each pixel 251B includes a photoelectric conversion element 252 and a pixel circuit 253 (AMP).

The vertical signal line 254B (second vertical signal line) is provided for each of columns of the pixel array 221B. Second pixel signals generated by the respective pixels 251B arranged in the corresponding column are output.

As illustrated in FIG. 6, vertical signal lines are cut at the boundaries between the pixel array 211A and the pixel array 211B. In other words, the plurality of vertical signal lines 254A and the plurality of vertical signal lines 254B are independent from each other.

Pixel signals generated by the plurality of pixels 251A at the upper half are read out to the upper side, and pixel signals generated by the plurality of pixels 251B at the lower half are read out to the lower side.

The vertical scanning unit 212 drives rows of the pixel array 211A and the rows of the pixel array 211B separately. The vertical scanning unit 212 includes vertical shift registers 221A and 221B (VSR) and a setting register 222. The vertical shift register 221A controls driving of the pixel array 211A. More specifically, the vertical shift register 221A performs processes of sequentially selecting the rows of the pixel array 211A. The vertical shift register 221B controls driving of the pixel array 211B. More specifically, the vertical shift register 221B performs processes of sequentially selecting the rows of the pixel array 211B. The setting register 222 stores setting information for controlling the vertical scanning unit 212. For example, the setting register 222 stores scanning order of rows in the pixel arrays 211A and 211B.

Figure 7:
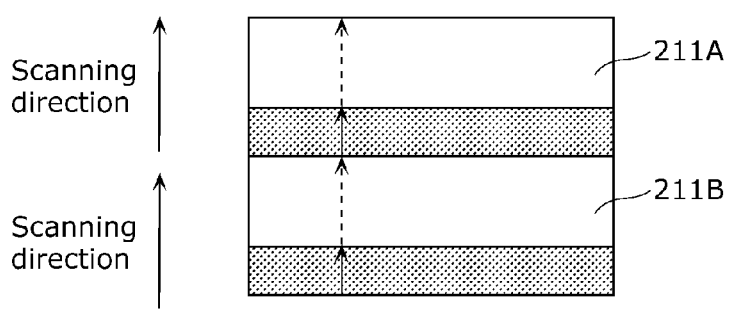
FIG. 7 is a diagram illustrating a scanning order of rows according to the embodiment.

At this time, the row scanning order is along the same direction in both of the pixel array 211A and the pixel array 211B. For example, as illustrated in FIG. 7, the rows are selected sequentially from the bottom to the top in the pixel array 211A and the pixel array 211B. More specifically, the rows in the pixel array 211A at the upper side are sequentially selected from the center to the top and the rows in the pixel array 211B at the lower side are sequentially selected from the bottom to the center.

The AD conversion unit 213A performs, for each column, AD conversion on the plurality of pixel signals (voltage signals) output from the pixel array 211A. The horizontal scanning unit 214A serially outputs the pixel signals corresponding to a row obtained through the AD conversion as pixel data 232A.

Likewise, the AD conversion unit 213B performs, for each column, AD conversion on the plurality of pixel signals (voltage signals) output from the pixel array 211B. The horizontal scanning unit 214B serially outputs the pixel signals corresponding to a row obtained through the AD conversion as pixel data 232B.

The imaging element 200 outputs digital signals in the example described here, but may output analog signals without performing AD conversion. The AD conversion when performed by the imaging element 200 accelerates output operations.

The timings of driving the two horizontal scanning units 214A and 214B are, for example, the same.

As illustrated in FIG. 4, the imaging element 200 may further include signal processing units 215A and 215B.

When imaging ranges are different between still image capturing and video capturing, the horizontal scanning units 214A and 214B remove unnecessary pixel data in the rows, and output the pixel data after the removal.

At this time, the pixel data 232A and 232B are output from an external output port to a general solid-state image pickup device to another signal processing circuit for image processing, due to characteristics of manufacturing processes or for the purpose of allowing versatile use of the imaging element 200. In this embodiment, the signal processing circuit 300 for image processing and the imaging element 200 are collectively referred to as a solid-state image pickup device 100.

The signal processing circuit 300 performs signal processing on the pixel data 232A and 232B to generate image data 334. The signal processing circuit 300 outputs, as a single image signal (image data 334), a plurality of second pixel signals (pixel data 232B) generated by the pixel array 211B in a first frame and a plurality of first pixel signals (pixel data 232A) generated by the pixel array 211A in a second frame immediately after the first frame. The signal processing circuit 300 includes image processing units 311A and 311B, a memory 312 (first memory), a selector 313, a frame memory 314 (second memory), a correction processing unit 315, and a clock stopping unit 316.

The image processing unit 311A generates pixel data 331A by performing a synchronization process and a YC process on the pixel data 232A. This pixel data 331A is transmitted to the frame memory 314 having a storage area for a picture, and is then stored in the frame memory 314.

On the other hand, the pixel data 232B is transmitted to a memory 312 having a size corresponding to at least a half of the frame memory 314, and is then stored in the memory 312. This memory 312 is, for example, a first-in first-out (FIFO) memory (hereinafter referred to as a FIFO memory). In other words, the memory 312 is a readable and writable memory of a first-in first-out format characterized by being used to store images temporarily, being capable of making high-speed access, and not requiring address setting. The memory 312 stores pixel data 232B in a one-frame period, and then outputs the pixel data 232B as pixel data 331B. In other words, the memory 312 delays the pixel data 232B by the one-frame period to generate the pixel data 331B. The memory 312 has a memory capacity larger than the size of the pixel data 232B corresponding to one frame.

The selector 313 selects one of the pixel data 232B output from the imaging element 200 and the pixel data 331B output from the memory 312, and outputs the selected pixel data 232B as the pixel data 332B.

The image processing unit 311B performs a synchronization process and a YC process on the pixel data 332B to generate pixel data 333B. This pixel data 333B is transmitted to the frame memory 314, and is then stored in the frame memory 314.

In other words, the frame memory 314 stores the pixel data 331A (232A) at the upper half of a current frame and the pixel data 333B (232B) at the lower half of an immediately previous frame, as one image data corresponding to a picture. Stated differently, the frame memory 314 stores the pixel data 333B at the lower half of a current frame and pixel data 331A at the upper half of an immediately succeeding frame, as the one image data corresponding to the picture.

The correction processing unit 315 performs a noise removal process on the image data corresponding to the one picture stored in the frame memory 314, and stores the image data after the noise removal onto the frame memory 314. The signal processing circuit 300 may further include a compression processing unit (not illustrated) that performs a compression process. The compression processing unit performs a compression process on the image data corresponding to the one picture stored in the frame memory 314, and stores the image data after the compression process onto the frame memory 314.

The image data 334 on which the sequence of processes have been performed is transmitted to a display device 402 such as a liquid crystal display. Alternatively, the image data 334 is stored in a recording medium 401 such as an SD card.

The memory 312 (FIFO memory) may be mounted in the imaging element 200. It is to be noted that the memory 312 when mounted outside the imaging element 200 can be also used as a memory of a DSP (digital signal processor).

Figure 8:
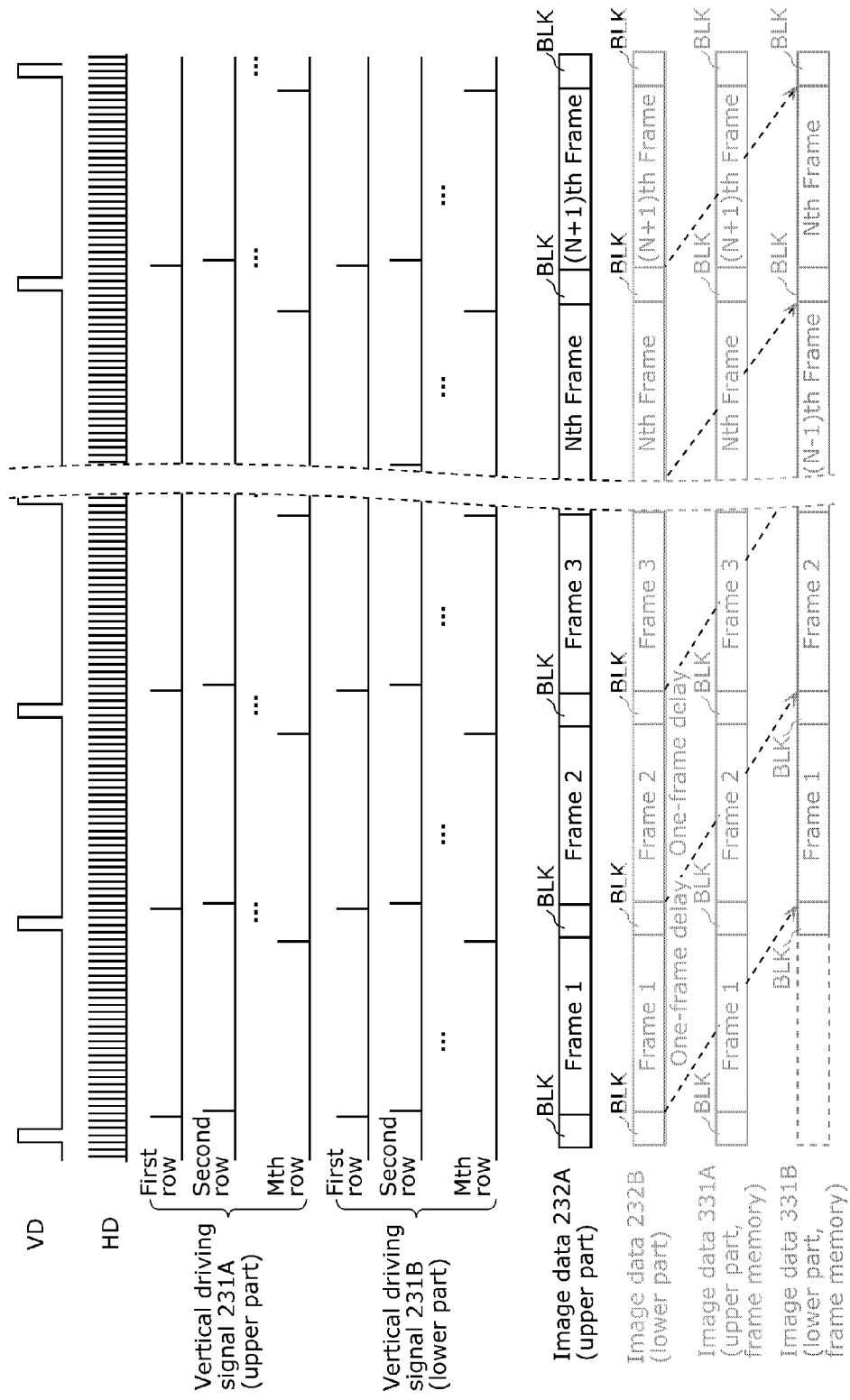
FIG. 8 is a timing chart of imaging operations according to the embodiment.

Hereinafter, operations performed by the solid-state image pickup device 100 are described. FIG. 8 is a timing chart of video capturing operations for sequentially obtaining images. In the following operations, the selector 313 selects output signals of the memory 312.

A vertical synchronization signal VD represents synchronization information of one frame. A horizontal synchronization signal HD represents synchronization information for one line (row).

A vertical driving signal 231A at the upper part is a signal for driving each row of the pixel array 211A at the upper part. The signal is generated by the vertical shift register 221A. A vertical driving signal 231B at the lower part is a signal for driving each row of the pixel array 211B at the lower part. The signal is generated by the vertical shift register 221B. These vertical driving signals 231A and 231B are applied sequentially one to one for each of the rows in a one-VD section. When each of the pixel array 211A and the pixel array 211B has M rows, the first to the Mth rows in each of the pixel array 211A and the pixel array 211B are driven sequentially. The pixels 251A and 251B in a driven one of the rows convert pixel signals which have been exposed and accumulated before the time point into voltage signals, and output the resulting voltage signals to the vertical signal lines 254A and 254B. The voltage signals are subject to AD conversion, and the pixel data 232A and 232B after the AD conversion are output from the horizontal scanning units 214A and 214B.

In order to output the pixel data most efficiently in terms of speed, it is desirable that the number of rows of the pixel array 211A at the upper side and the number of rows of the pixel array 211B at the lower side be the same while the numbers of rows may vary.

Scanned pixel data 232A and 232B in the Nth frame are respectively output from the horizontal scanning units 214A and 214B to the signal processing circuit 300. At the time when scanning of the Nth frame and data transfer from the imaging element 200 to the signal processing circuit 300 are completed, the pixel data 232A at the upper part of the Nth frame is subject to image processing, and then is written onto the frame memory 314 as pixel data 331A. On the other hand, the pixel data 232B at the lower part of the Nth frame is stored in the memory 312.

In the next frame ((N+1)th frame), a pixel scanning process for the (N+1)th frame is performed in each of the pixel arrays 211A and 211B arranged vertically.

At this time, the pixel data 232B (333B) at the lower part of the Nth frame stored in the memory 312 is written onto the frame memory 314, and the pixel data 331A at the upper part of the (N+1)th frame is also written onto the same at the same time.

Figure 9:
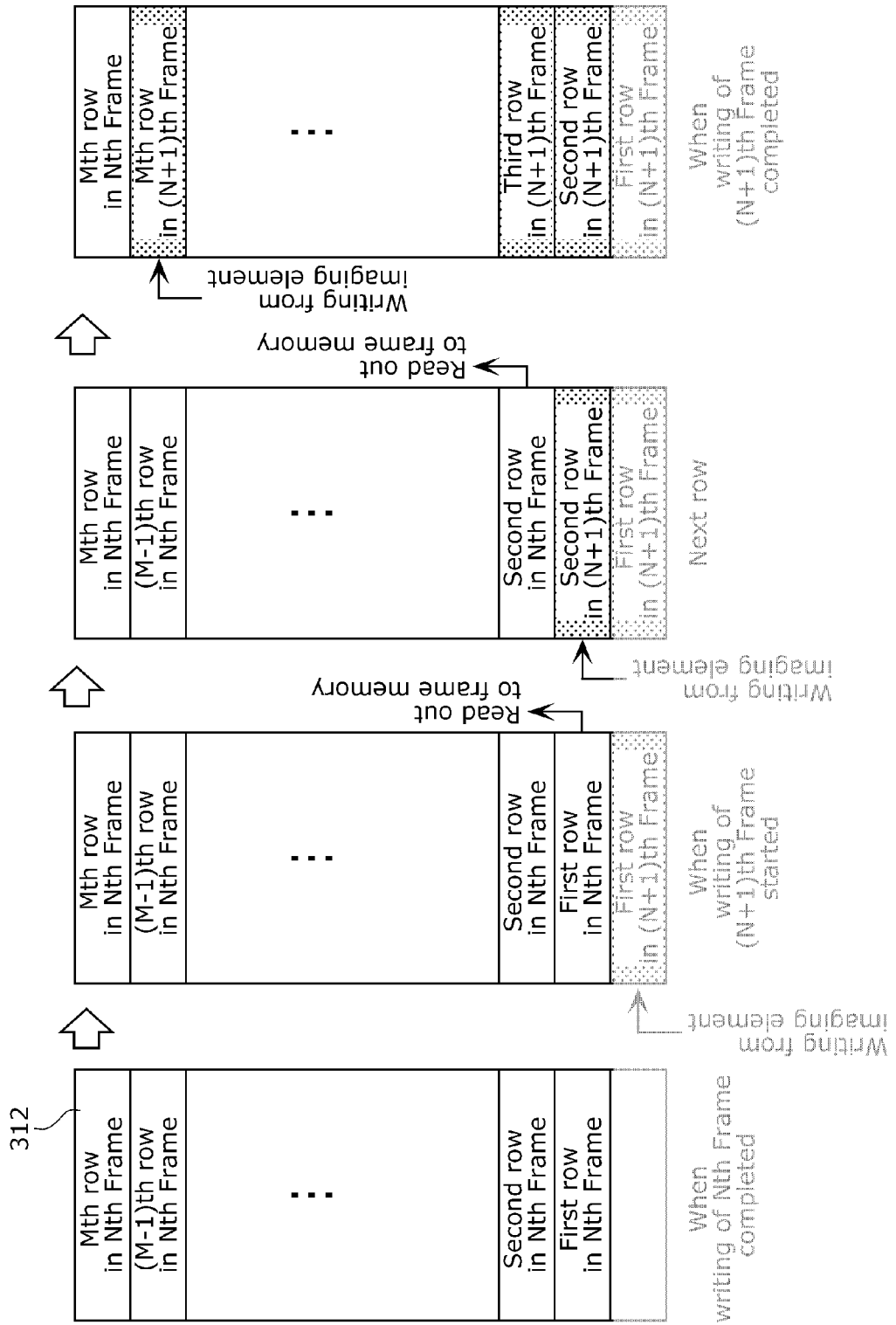
FIG. 9 is a diagram illustrating operations of a first-in first-out (FIFO) memory according to the embodiment.

As illustrated as operations in FIG. 9, the pixel data 232B (333B) of the Nth frame is transferred onto the frame memory 314, and the pixel data 232B at the lower part of the (N+1)th frame is written onto the memory 312 at the same time.

Here, it is impossible to access the same address in the memory 312 and to read data therefrom and write data thereat simultaneously. For this reason, the memory 312 needs to have a capacity corresponding to or larger than the amount corresponding to the half of a picture plus one address.

At the time when the processing of the (N+1)th frame is completed, the pixel data 331A at the upper part of the (N+1)th frame and the pixel data 333B at the lower part of the Nth frame are written onto the frame memory 314.

As illustrated in FIG. 8, the first frame in the input onto the frame memory does not have pixel data 333B corresponding to pixel data 331A at the upper part, and only has the image data at the upper half. For the first frame, the signal processing circuit 300 stores the pixel data 331A at the upper part onto the frame memory 314, then discards the pixel data 331A, and outputs the pixel data 334 of the second and succeeding frames.

On the other hand, there is no need to use the memory 312 when, for example, capturing still images using also a mechanical shutter in a camera instead of capturing video. The mechanism for outputting the pixel data 232B at the lower part with a one-frame delay may be even an obstacle. In view of this, a selector 313 is provided at the later stage of the memory 312.

The selector 313 selects one of the pixel data 331B output from the memory 312 and the plurality of pixel data 232B before being stored in the memory 312, and outputs the selected plurality of pixel data to the frame memory 314 via the image processing unit 311B. The frame memory 314 stores, as one image data, the pixel data 332B (333B) output from the selector 313 and the pixel data 331A.

More specifically, the selector 313 switches signals to be selected according to an operation mode signal representing either a video capturing mode or a still image capturing mode. More specifically, the selector 313 outputs, as the pixel data 332B, the pixel data 331B output from the memory 312 when capturing video, and outputs, as the pixel data 332B, the pixel data 232B output from the imaging element 200 when capturing still images. In this way, operation modes are switched between still image capturing and video capturing.

Furthermore, the solid-state image pickup device 100 may stop (fix) a clock signal (a memory clock) to be supplied to the memory 312 when capturing still images. More specifically, the clock stopping unit 316 supplies a clock signal to the memory 312 when capturing a video according to an operation mode signal, and does not supply a clock signal to the memory 312 when capturing a still image. In other words, the clock stopping unit 316 stops supply of a clock signal to the memory 312 when the selector 313 selects pixel data 232B prior to storage onto the memory 312. This reduces unnecessary electric power consumption.

The order of scanning rows in the pixel arrays 211A and 211B may be modified according to a value to be stored in the setting register 222. For example, the vertical scanning unit 212 may switch between a mode using the same scanning direction in both the pixel arrays 211A and 211B and a mode using different scanning directions in the respective pixel arrays 211A and 211B.

Figure 10:
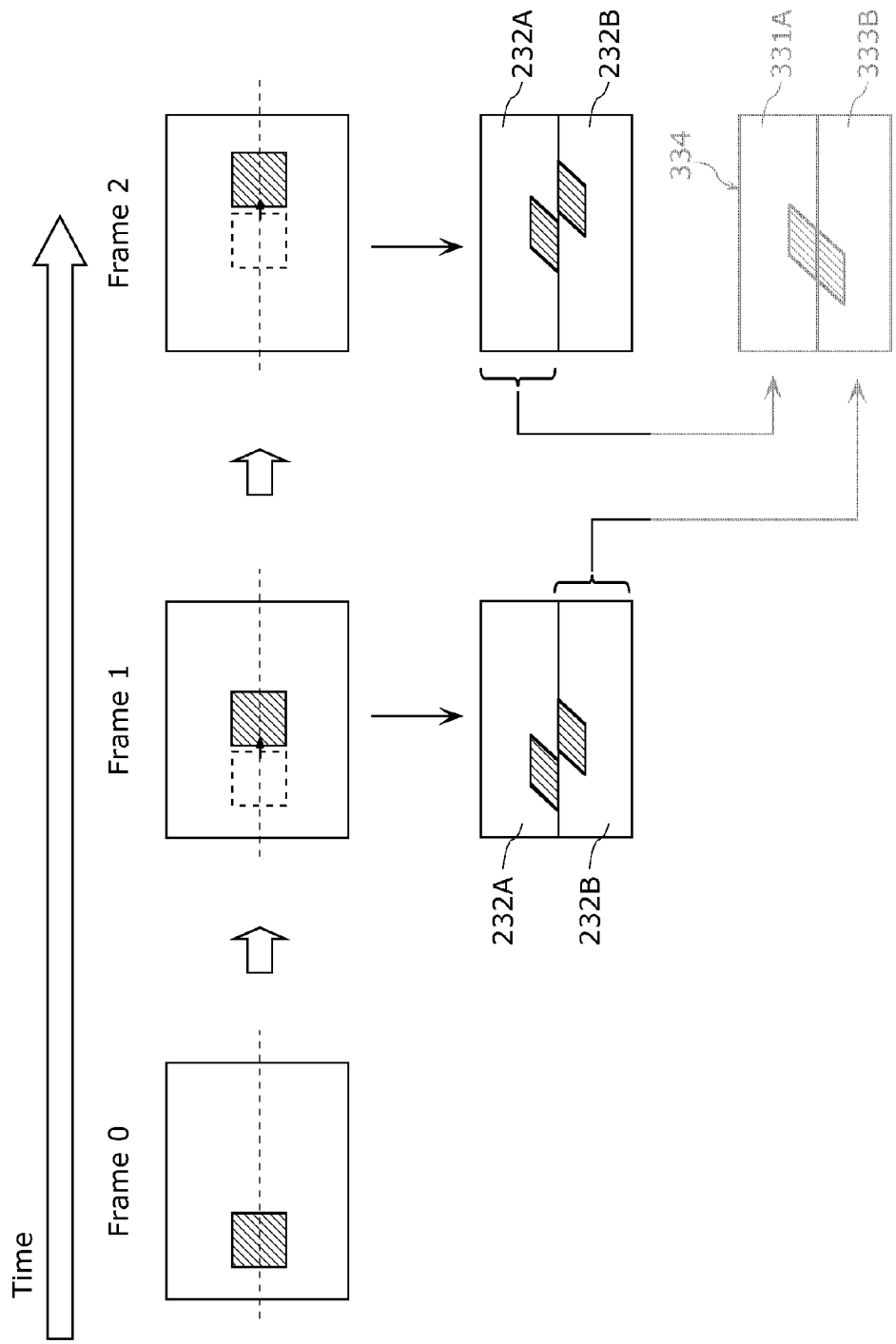
FIG. 10 is a diagram illustrating imaging operations according to the embodiment.
Figure 11:
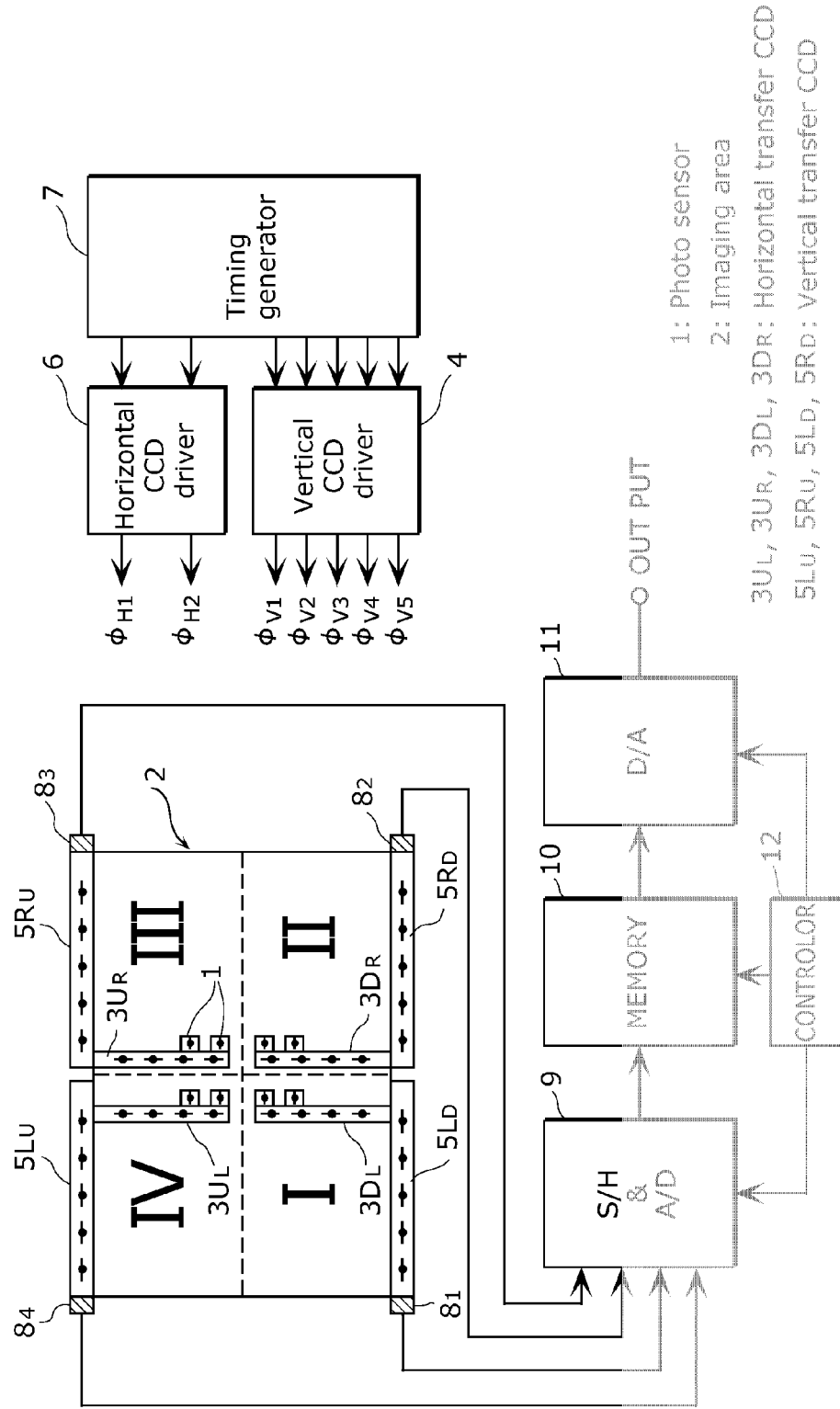
FIG. 11 is a diagram illustrating a conventional solid-state image pickup device.

Hereinafter, effects provided by the solid-state image pickup device 100 are described with reference to FIG. 10. As illustrated in FIG. 10, a subject moves in the horizontal direction. As described above, scanning is performed from bottom to top in both of the pixel array 211A at the upper part and the pixel array 211B at the lower part. In other words, in each of the pixel arrays 211A and 211B, the time point at which an image of a pixel is obtained is earlier as the pixel is located closer to the lower side of a corresponding one of the pixel arrays 211A and 211B and is later as the pixel is located closer to the upper side of the same. As a result, in each of the pixel array 211A and the pixel array 211B, images of the subject decline along the movement direction of the subject. The same phenomenon occurs when the image pickup device moves in the horizontal direction.

Furthermore, when scanning processes are performed in the same direction at the same time as in the two pixel arrays 211A and 211B as in this embodiment, an image of the subject at a picture part corresponding to the boundaries between the pixel arrays 211A and 211B may be distorted significantly and be even cut.

On the other hand, when scanning processes are performed in different directions, that is, each in either the direction from the center (boundary part) toward outside or the direction from the outside to the center in each of the pixel arrays 211A and 211B, it is possible to match pixel data obtainment times at the boundary parts, and thus no object therein looks cut. However, in this case, distortion directions are opposite at the boundary between the pixel arrays, resulting in an unnatural image in which the subject is folded at the boundary.

In order for a CMOS solid-state image pickup device to be able to operate a global shutter at the time of video capturing, a camera for use therewith needs to mount an extremely complex mechanism. Mounting the mechanism increases cost.

On the other hand, the solid-state image pickup device 100 in this embodiment outputs, as one image data 334, the pixel data 232B at the lower part of Frame 1 and the pixel data 232A at the upper part of Frame 2 illustrated in FIG. 10. In this way, it is possible to reduce distortion of images of the subject at a picture part corresponding to the boundaries between the pixel arrays 211A and 211B. The solid-state image pickup device 100 is capable of accelerating operations by reading the pixel data 232A and 232B at the same time from the pixel arrays 211A and 221B arranged vertically while achieving an image quality equivalent to the one obtainable by reading pixel data from a single pixel array.

Although scanning processes are performed from bottom to top in the pixel arrays 211A and 211B in the example described above, scanning processes may be performed from top to bottom instead. In this case, it is possible to provide the same effects by delaying the pixel data 232A by one frame. In other words, the solid-state image pickup device 100 may output, as one image data 334, the image data 232A of a current frame and the image data 232B of the next frame.

The solid-state image pickup device according to this embodiment of the present disclosure has been described above, but the present disclosure is not limited to this embodiment.

The processing units included in the solid-state image pickup device according to the embodiment are implemented as an LSI that is typically an integrated circuit. These processing units may be made as separate individual chips, or as a single chip to include a part or all thereof.

The means for circuit integration is not limited to an LSI, and implementation with a dedicated circuit or a general-purpose processor is also available. It is also possible to use a field programmable gate array (FPGA) that is programmable after the LSI is manufactured, and a reconfigurable processor in which connections and settings of circuit cells within the LSI are reconfigurable.

The functions of the solid-state image pickup device according to the embodiment of the present disclosure may partly be performed by means of a processor such as a CPU executing a program.

The present disclosure may be implemented as the program or a non-transitory computer-readable recording medium on which the program is recorded. The program can naturally be distributed through a transmission medium such as the Internet.

The numerals used above are examples for specifically illustrating the whole disclosure, and the present disclosure is not limited to the exemplary numerals. Furthermore, a switching state represented by either a logical level represented by high or low or by on or off is an example for specifically illustrating the present disclosure. The logical levels or switching states in each of the exemplary combinations may be different, and equivalent results can be obtained. Furthermore, the configuration of the above-described logical circuit is an example for specifically illustrating the present disclosure. A logical circuit configured differently can also realize an equivalent input-output relationship. The n type and p type of transistors etc. are examples for specifically illustrating the present disclosure. Transistors of inverted types can also provide equivalent results. The connection relationship between constituent elements is an example for specifically illustrating the present disclosure. The connection relationship for implementing the functions of the present disclosure is not limited thereto.

The division of the functional blocks in each block diagram is a non-limiting example. A plurality of functional blocks may be implemented as a single functional block, a single functional block may be divided into plural functional blocks, or the functions of one of the functional blocks are partly transferred to another one of the functional blocks. The functions of some of the functional blocks having similar functions may be executed in parallel or by time division by a single piece of hardware or software.

Although the solid-state image pickup device according to one or more aspects has been described above based on the exemplary embodiment, the present disclosure is not limited to the exemplary embodiment. Those skilled in the art will readily appreciate that many modifications are possible in the exemplary embodiment and the constituent elements of the exemplary embodiment can be arbitrarily combined with other embodiments without materially departing from the novel teachings and advantages of the present disclosure. Accordingly, all such modifications and embodiments are intended to be included within the scope of one or more aspects of the present disclosure.

INDUSTRIAL APPLICABILITY

The present disclosure is applicable to a solid-state image pickup device. The present disclosure is applicable to various kinds of devices such as digital still cameras, digital video cameras, mobile phones, smartphones, each of which uses a solid-state image pickup device.

The invention claimed is:

1. A solid-state image pickup device which generates, as a plurality of pixel signals, a plurality of first pixel signals and a plurality of second pixel signals, the solid-state image pickup device comprising:
   a first pixel array in which the plurality of first pixels are arranged two-dimensionally, the plurality of first pixels generating a plurality of first pixel signals by photo-electrically converting received light;
   a second pixel array that is arranged vertically adjacent to the first pixel array and in which the plurality of second pixels are arranged two-dimensionally, the plurality of second pixels generating a plurality of second pixel signals by photo-electrically converting received light;
   a plurality of first vertical signal lines each of which is provided for a corresponding one of columns of the first pixel array and receives a corresponding one of first pixel signals generated by first pixels arranged in the corresponding one of the columns, the first pixels being included in the plurality of first pixels;
   a plurality of second vertical signal lines each of which is provided for a corresponding one of columns of the second pixel array and receives a corresponding one of second pixel signals generated by second pixels arranged in the corresponding one of the columns, the second pixels being included in the plurality of second pixels, the plurality of second vertical signal lines being independent from the plurality of first vertical signal lines;
   a vertical scanning unit configured to drive rows of the first pixel array and rows of the second pixel array independently; and
   a signal processing circuit which outputs, as a single image signal, a pair of (i) the plurality of second pixel signals generated in the second pixel array in a first frame and (ii) the plurality of first pixel signals generated in the first pixel array in a second frame immediately after the first frame.

2. The solid-state image pickup device according to claim 1,
   wherein the vertical scanning unit is configured to scan the rows of the first pixel array and the rows of the second pixel array in a same direction.

3. The solid-state image pickup device according to claim 2,
   wherein the vertical scanning unit is configured to scan the rows of the first pixel array from a boundary between the first pixel array and the second pixel array, and scan the rows of the second pixel array to the boundary.

4. The solid-state image pickup device according to claim 1, further comprising
   a horizontal scanning unit configured to output the plurality of pixel signals,
   wherein the signal processing circuit includes
   a selector in which the plurality of pixel signals output from the horizontal scanning unit are switched.

5. The solid-state image pickup device according to claim 1,
   wherein the signal processing circuit includes:
   a first memory which outputs the plurality of second pixel signals after storage for a one-frame period; and
   a second memory which stores, as the single image signal, the plurality of second pixel signals output from the first memory and the plurality of first pixel signals.

6. The solid-state image pickup device according to claim 4,
   wherein the first memory is a first-in first-out (FIFO) memory having a memory capacity larger than an amount corresponding to the plurality of second pixel signals corresponding to one frame.

7. The solid-state image pickup device according to claim 4,
   wherein the signal processing circuit further includes a selector which (i) selects either the plurality of second pixel signals to be output from the first memory or the plurality of second pixel signals before being stored in the first memory, and (ii) outputs, to the second memory, the plurality of second pixel signals selected, and
   the second memory stores, as the single image signal, the plurality of second pixel signals output from the selector and the plurality of first pixel signals.

8. The solid-state image pickup device according to claim 6,
   wherein the signal processing circuit further includes
   a clock stopping unit configured to stop supply of a clock signal to the first memory when the selector selects the plurality of second pixel signals before being stored in the first memory.

* * * * *